(12) United States Patent
Shim et al.

(10) Patent No.: US 9,348,155 B2
(45) Date of Patent: May 24, 2016

(54) TUNABLE PHOTONIC CRYSTAL COLOR FILTERS AND COLOR IMAGE DISPLAY DEVICES

(71) Applicant: Samsung Electronics Co., Ltd., Suwon-Si, Gyeonggi-Do (KR)

(72) Inventors: Hong-shik Shim, Seoul (KR);
Moon-gyu Han, Yongin-si (KR);
Chul-joon Heo, Busan (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/028,977

(22) Filed: Sep. 17, 2013

(65) Prior Publication Data
US 2014/0078570 A1    Mar. 20, 2014

(30) Foreign Application Priority Data
Sep. 19, 2012    (KR) .................. 10-2012-0104214

(51) Int. Cl.
*G02F 1/00* (2006.01)
*G02B 26/08* (2006.01)
*G02F 1/29* (2006.01)
*G02F 1/03* (2006.01)
*G02F 1/21* (2006.01)
*B82Y 20/00* (2011.01)

(52) U.S. Cl.
CPC ............... *G02F 1/0305* (2013.01); *G02F 1/21* (2013.01); *B82Y 20/00* (2013.01); *G02F 2202/32* (2013.01); *G02F 2203/34* (2013.01); *Y10S 977/773* (2013.01)

(58) Field of Classification Search
CPC .................... Y10S 977/773; H04B 10/505
USPC ......... 359/296, 290–292, 295, 298, 321–324; 345/107
See application file for complete search history.

(56) References Cited

U.S. PATENT DOCUMENTS

| 6,738,178 | B2 * | 5/2004 | Albu et al. ................ 359/321 |
| 7,746,542 | B2 * | 6/2010 | Akashi et al. ............. 359/296 |
| 2001/0005245 | A1 * | 6/2001 | Sakamoto et al. ........ 349/106 |
| 2011/0233476 | A1 | 9/2011 | Arsenault |
| 2011/0235161 | A1 * | 9/2011 | Joo et al. .................. 359/296 |
| 2013/0258441 | A1 | 10/2013 | Shim et al. |

FOREIGN PATENT DOCUMENTS

KR    10-0922892 B1    10/2009
KR    20110009647 A    1/2011
(Continued)

OTHER PUBLICATIONS

European Extended Search Report dated May 12, 2014 for European Application No. 13184794.9.
(Continued)

*Primary Examiner* — Tuyen Tra
(74) *Attorney, Agent, or Firm* — Harness, Dickey & Pierce, P.L.C.

(57) ABSTRACT

Tunable photonic crystal color filters, and color image display devices including the same, include a first electrode, a second electrode facing the first electrode, a medium between the first electrode and the second electrode, nano particles distributed in the medium in a lattice structure and charged, and an ion spread preventing layer over a surface of at least one of the first electrode and the second electrode.

19 Claims, 5 Drawing Sheets

(56) References Cited

FOREIGN PATENT DOCUMENTS

KR      20110031645 A     3/2011
KR      20110103303 A     9/2011

OTHER PUBLICATIONS

Hongshik Shim et al., *Spectral reflectance switching of colloidal photonic crystal structure composed of positively charged TiO2 nanoparticles*, Applied Physics Letters, vol. 100, No. 6, Feb. 6, 2012.

Criante, Luigino et al., *Low-voltage tuning in a nanoparticle/liquid crystal photonic structure*, Journal of Physical Chemistry, vol. 116, No. 40, Sep. 18, 2012, pp. 21572-21576.

Arsenault, A.: "Photonic-crystal full-colour displays"; Nature Publishing Group; Nature Photonics, 1, 468-472; 2007.

Xu, T.: "Ion exchange membranes: State of their development and perspective"; Elsevier B.V.; Journal of Membrane Science, 263, 1-29; 2005.

Lee I. et al.: "Quasi-Amorphous Colloidal Structures for Electrically Tunable Full-Color Photonic Pixels with Angle-Independency"; Advanced Materials, 22, 4973-4977; 2010.

* cited by examiner

TUNABLE PHOTONIC CRYSTAL COLOR FILTERS AND COLOR IMAGE DISPLAY DEVICES

CROSS-REFERENCE TO RELATED APPLICATIONS

This application claims the benefit of priority under 35 U.S.C. §119 from Korean Patent Application No. 10-2012-0104214, filed on Sep. 19, 2012, in the Korean Intellectual Property Office, the disclosure of which is incorporated herein in its entirety by reference.

BACKGROUND

1. Field

Example embodiments relate to tunable photonic crystal color filters and/or color image display devices including the same.

2. Description of the Related Art

A color image display device generally includes an image panel for displaying gradients and color filters for applying colors thereto.

A reflective type color image display device displays colors via transmission or reflection using area-divided 3 color filters fixed in respective pixels. In case of displaying primary colors or colors similar to primary colors, such an area-divided color filter blocks lights corresponding to the other colors, and thus color loss is significant.

Furthermore, absorption type color filters are widely used in color image display devices. Here, an absorption type color filter only transmits lights corresponding to desired colors and absorbs lights corresponding to the other colors, and thus light loss is significant. Furthermore, if an absorption type color filter is used in a reflective type color image display device, it is necessary for a light to pass through a color filter twice due to the mechanism of the reflective type color image display device, light losses occur twice at the color filter, and thus it is difficult to display bright colors.

Therefore, color filters including photonic crystals which reflect lights corresponding to colors of a photonic band gap and transmit lights corresponding to the other colors are being researched to replace absorption type color filters.

SUMMARY

Example embodiments relate to tunable photonic crystal color filters and/or color image display devices including the same.

Provided are tunable photonic crystal color filters with improved color fidelity and reliability.

Provided are color image display devices including tunable photonic crystal color filters with improved color fidelity and reliability.

According to example embodiments, a tunable photonic crystal color filter includes a first electrode, a second electrode facing the first electrode, a medium between the first electrode and the second electrode, nano particles distributed in the medium with a lattice structure, the nano particles being charged, and an ion spread preventing layer over a surface of at least one of the first electrode and the second electrode.

The ion spread preventing layer may include a barrier layer suppressing hydroxyl ions generated on the at least one of the first electrode and the second electrode from spreading into at least one of medium and the nano particles.

The ion spread preventing layer may be formed of a perfluorocarbonic sulfonic acid or a sulfonated tetrafluoroethylene based fluoropolymer.

The ion spread preventing layer may include a barrier layer suppressing hydrogen ions generated on the at least one of the first electrode and the second electrode from spreading into at least one of the medium and the nano particles.

The ion spread preventing layer may include at least one selected from a quaternary ammonium base, a quaternary pyridinium base, and a quaternary imidazolium base.

At least one of the first electrode and the second electrode may be a transparent electrode.

The first electrode may be transparent and the second electrode is black.

The medium may include an aqueous solution.

The first electrode may be a cathode electrode, and a negative ion spread preventing layer may be over an inner side surface of the first electrode.

The second electrode may be an anode electrode, and a positive ion spread preventing layer may be over an inner side surface of the second electrode.

According to other example embodiments, a color image display device includes a first electrode, a second electrode facing the first electrode, a medium between the first electrode and the second electrode, a nano particles distributed in the medium, the nano particles being in a lattice structure and the nano particles being charged; an ion spread preventing layer over a surface of at least one of the first electrode and the second electrode, a circuit layer including a plurality of switching devices, the circuit layer being configured to apply voltages to the first electrode and the second electrode, and a control unit configured to control the switching device and the circuit layer.

The ion spread preventing layer may include a barrier layer suppressing hydroxyl ions generated on the at least one of the first electrode and the second electrode from spreading into at least one of the medium and the nano particles.

The ion spread preventing layer may be formed of a perfluorocarbonic sulfonic acid or a sulfonated tetrafluoroethylene based fluoropolymer.

The ion spread preventing layer may include a barrier layer suppressing hydrogen ions generated on the at least one of the first electrode and the second electrode from spreading into at least one of the medium and the nano particles.

The ion spread preventing layer may comprise at least one selected from a quaternary ammonium base, a quaternary pyridinium base, and a quaternary imidazolium base.

The second electrode may be formed of a conductive metal oxide.

At least one of the first electrode and the second electrode may be a transparent electrode.

The first electrode may be transparent, and the second electrode may be black.

The medium may comprise an aqueous solution.

The color image display device may further comprise a light absorbing layer under the circuit layer.

According to still other example embodiments, a tunable color filter includes electrode layers separated from each other, a photonic crystal layer interposed between the electrode layers, and an ion spread preventing layer interposed between the photonic crystal layer and at least one of the electrode layers.

The photonic crystal layer may comprise an aqueous medium between the electrode layers, and charged nano particles may be dispersed in the aqueous medium.

The charged nano particles may be spread apart from each other in the form of a lattice structure, and an interval between the charged nanoparticles may change a on the voltage across the electrode layers.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
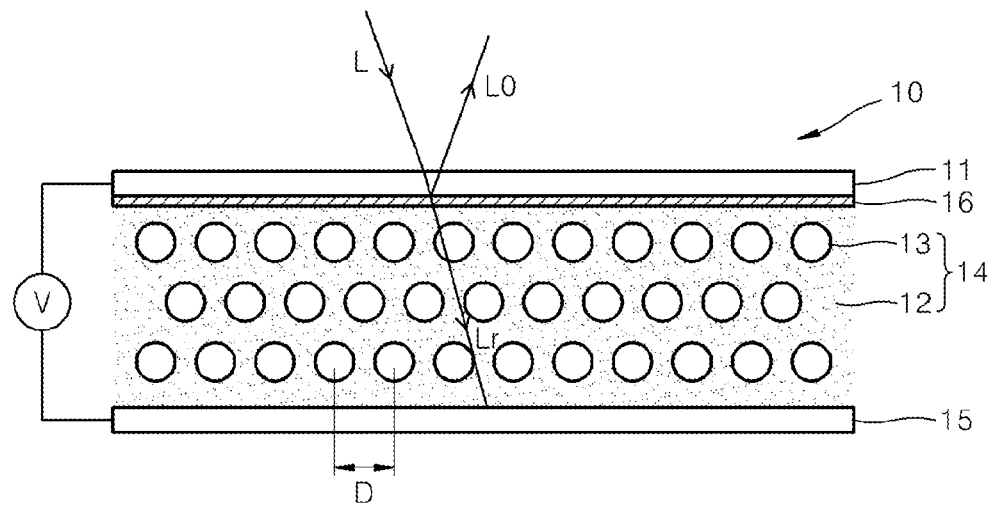
FIG. 1 is a schematic diagram showing a tunable photonic crystal color filter according to example embodiments.

Various example embodiments will now be described more fully with reference to the accompanying drawings in which some example embodiments are shown. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments relate to tunable photonic crystal color filters and/or color image display devices including the same.

FIG. 1 is a schematic diagram showing a tunable photonic crystal color filter according to example embodiments.

Referring to FIG. 1, a tunable photonic crystal color filter 10 includes a first electrode 11 and a second electrode 15 facing the first electrode 11. A photonic crystal layer 14 may be arranged between the first electrode 11 and the second electrode 15. The photonic crystal layer 14 may include a medium 12 and nano particles 13 spread in the medium 12. The nano particles 13 are charged and may spread in the medium 12 in a lattice structure. An ion spread preventing layer may be arranged on a surface of at least one of the first electrode 11 and the second electrode 15. FIG. 1 shows an example in which a first ion spread preventing layer 16 is arranged below, or under, the first electrode 11. For example, the first electrode 11 may be a cathode electrode, whereas the second electrode 15 may be an anode electrode. The first ion spread preventing layer 16 may be a negative ion spread preventing layer. The first ion spread preventing layer 16 may include a layer for suppressing spread of hydroxyl ions, for example. The first ion spread preventing layer 16 may contain a perfluorocarbonic sulfonic acid or a sulfonated tetrafluoroethylene based fluoropolymer, for example. For example, the first ion spread preventing layer 16 may be a product commercialized under the trademark of Nafion® of Dupont.

A photonic crystal is an artificial crystal formed by periodically arranging materials with different dielectric constants, such that a photon band gap (PBG) is formed which affects the energy spectrum of electromagnetic waves. When light is incident to a photonic crystal, light is transmitted through the photonic crystal without being spread for most wavelengths. However, a reflective region may be a region where light is not transmitted at particular wavelengths (or frequencies). The region is referred to as a PBG. If light having a wavelength (or a frequency) corresponding to the PBG is incident to the photonic crystal, the light may not propagate into the photonic crystal and be reflected. A photonic crystal is formed by periodically arranging dielectric materials, where size or location of a PBG may vary according to refractive indexes and periodic structures. In the photonic crystal layer 14, the nano particles 13 form a photonic crystal structure by being regularly spread by electrokinetic phenomena. Furthermore, a PBG of the photonic crystal layer 14 may be changed by changing at least one from among shape of a photonic crystal, volume of the photonic crystal, interval between nano particles, and refractive index of the photonic crystal. As a PBG is changed, wavelength bandwidth of light to be reflected may be adjusted. Therefore, the tunable photonic crystal color filter 10 may modulate color of a light reflected from an external light L. For example, if the external light L is incident to the tunable photonic crystal color filter 10, a light LO corresponding to a first wavelength band may be reflected and a light Lr corresponding to the other wavelength band may be transmitted.

In the tunable photonic crystal color filter 10, because the nano particles 13 are charged, when a voltage V is applied between the first electrode 11 and the second electrode 15, the nano particles 13 move according to the voltage V. Therefore, interval between the nano particles 13 is changed, and thus a PBG may be changed according to the interval between the nano particles 13. The PBG of the photonic crystal layer 14 determines wavelengths of lights to be reflected, where the PBG depends on at least one of sizes of the nano particles 13 and interval between the nano particles 13. Therefore, sizes of the nano particles 13 may be suitably determined based on wavelengths of lights to be reflected. For example, the nano particles 13 may have sizes from dozens of nm to hundreds of nm. For example, the nano particles 13 may have sizes of hundreds of nm, e.g., about 300 nm, to reflect colors corresponding to the visible ray band.

At least one of the first electrode 11 and the second electrode 15 may be transparent to pass light. For example, the first electrode 11 at the side of light incidence may be transparent.

For example, the first electrode 11 may be a cathode electrode, whereas the second electrode 15 may be an anode electrode. If there is no ion spread preventing layer on the cathode electrode and the anode electrode, negative ions from the cathode electrode and positive ions from the anode electrode spread into the photonic crystal layer 14, and the negative ions and the positive ions surround the nano particles. Therefore, surface charges of the nano particles may decrease. As a result, repulsions between the nano particles may decrease, thereby reducing crystallinity of the nano particles. Therefore, color reproducibility and clarity may be deteriorated. However, according to the present example embodiments, an ion spread preventing layer is provided to suppress ions from a first electrode and/or a second electrode from being spread into a photonic crystal layer, thereby improving color reproducibility.

The first electrode 11 may be formed of a conductive metal oxide for excellent transmittance. The second electrode 15 may or may not be transparent. For example, the second electrode 15 may have black color to absorb transmitted light. If the second electrode 15 has black color, the second electrode 15 may absorb light transmitted through the photonic crystal layer 14. If the second electrode 15 absorbs light transmitted through the photonic crystal layer 14, the second electrode 15 may prevent light from reflecting back to the photonic crystal layer 14 by another layer below the second electrode 15.

Next, operating mechanism of the tunable photonic crystal color filter will be described below.

The nano particles 13 are positively (+) charged or negatively (−) charged and may spread to be apart from one another due to electrostatic repulsion. When a voltage V is applied to the first electrode 11 and the second electrode 15, an electric field E is formed in the medium 12. Here, the nano particles 13 having electric double layers move in the medium 12 in a direction toward the first electrode 11 or the second electrode 15, spread regularly while forming an equilibrium with electrostatic repulsion, and constitute a lattice structure in which the nano particles 13 are arranged at a constant lattice interval D.

The lattice structure of the photonic crystal layer 14 has a PBG for reflecting or transmitting lights of particular wavelengths due to periodic distribution of refractive indexes. According to the Bragg's law, light of a particular wavelength according to Equation 1 below is not transmitted through the photonic crystal layer 14 and is reflected.

$$m\lambda = 2nD \cdot \sin\theta \qquad \text{[Equation 1]}$$

Here, $\lambda$ denotes wavelength of light that is diffracted or reflected, n denotes the effective refractive index of the photonic crystal layer 14, D denotes lattice interval of the photonic crystal layer 14, and $\theta$ denotes an angle of incidence of the light. m is an integer.

If the voltage V applied to the first electrode 11 and the second electrode 15 is changed, equilibrium with electrostatic repulsion is changed, and thus the lattice interval D between the nano particles 13 is changed. Therefore, wavelength $\lambda$ of a reflected light LO may be controlled by adjusting the voltage V applied to the first electrode 11 and the second electrode 15. For example, as the voltage V applied to the first electrode 11 and the second electrode 15 increases, the wavelength of the light LO reflected by the photonic crystal layer 14 may be reduced.

Meanwhile, characteristics of a photonic crystal layer according to types of a medium will be described below. If a medium is an organic solvent and charged nano particles are distributed in the organic solvent, uniformity of a lattice may not be secured, because nano particles are not sufficiently charged in the organic solvent. Therefore, reflection spectrum may not be sharp enough, and colors may not be clear. Furthermore, if charged nano particles are distributed in an aqueous solution, the nano particles in the aqueous solution have sufficient surface charges, and thus the peak of reflection spectrum is sharp. However, if a voltage is applied to an electrode to form an electric field, electrolysis of the aqueous solution may be induced at a predetermined (or, alternatively, set) voltage, and thus charges of the nano particles or electric field in the medium may be changed. As a result, a lattice structure may collapse. According to the present example embodiments, because an ion spread preventing layer is arranged on (or, alternatively, over) at least one from between the first electrode 11 and the second electrode 15, negative ions or positive ions generated by the first electrode 11 or the second electrode 15 are blocked by the ion spread preventing layer, thereby reducing or preventing ions from spreading into the photonic crystal layer 14.

For example, if the medium 12 is an aqueous solution, reactive formulas regarding the first electrode 11 and the second electrode 15 are as shown below.

$$2H_2O+2e- \rightarrow H_2(g)+2OH^-(aq) \quad \text{(cathode electrode)}$$

$$2H_2O \rightarrow O_2(g)+4H^+(aq)+4e- \quad \text{(anode electrode)}$$

$H^+$ ions may be generated from the anode electrode, whereas $OH^-$ ions may be generated from the cathode electrode. The first ion spread preventing layer 16 arranged on the first electrode 11 blocks negative ions, that is, hydroxyl ($OH^-$) ions, thereby reducing or preventing $OH^-$ ions from spreading into the photonic crystal layer 14.

Figure 2:
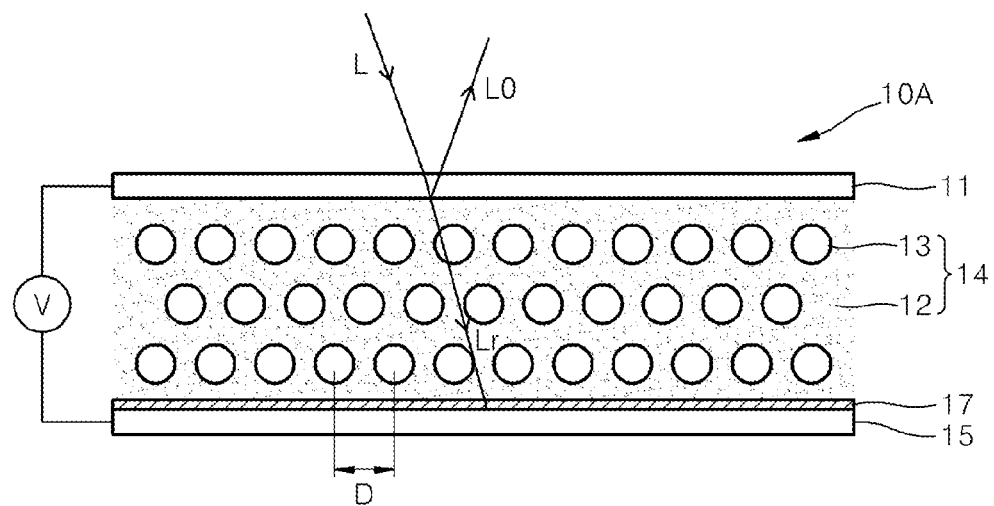
FIG. 2 is a diagram showing the tunable photonic crystal color filter in which an ion spread preventing layer is arranged on a different electrode according to other example embodiments.

FIG. 2 is a diagram showing the tunable photonic crystal color filter in which an ion spread preventing layer is arranged on a different electrode according to other example embodiments.

Referring to FIG. 2, in a tunable photonic crystal color filter 10A, a second ion spread preventing layer 17 is arranged above (or, alternatively, over) the second electrode 15. The second ion spread preventing layer 17 may include a layer for suppressing positive ions from being spread. The second ion spread preventing layer 17 may include at least one from among quaternary ammonium base, quaternary pyridinium base, and quaternary imidazolium base, for example. For example, the second ion spread preventing layer 17 may be a product commercialized under the trademark of FAA-3. If the medium 12 is an aqueous solution, positive ions, that is, hydrogen ($H^+$) ions may be generated from the second electrode 15. Furthermore, the $H^+$ ions are blocked by the second ion spread preventing layer 17 arranged on the second electrode 15, thereby reducing or preventing $H^+$ ions from spreading into the photonic crystal layer 14. Because the first ion spread preventing layer 16 and the second ion spread preventing layer 17 reduce or prevent positive ions and negative ions from being spread into the photonic crystal layer 14, ion adherences to the nano particles 13 may be reduced. As a result, breakdown of crystallinity due to changes in charges of the nano particles 13 or changes in an electric field in the medium 12 induced by ions may be prevented.

Figure 3:
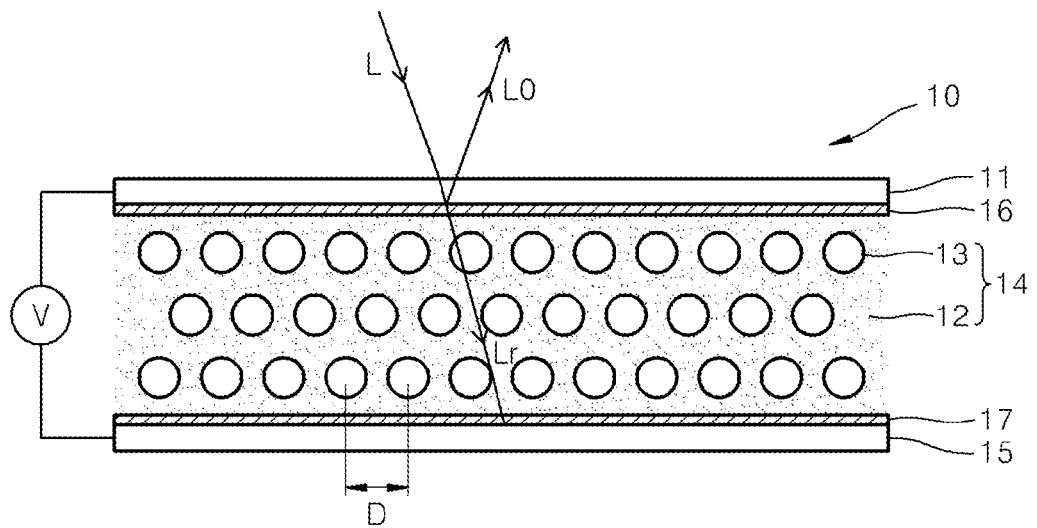
FIG. 3 is a diagram showing the tunable photonic crystal color filter in which ion spread preventing layers are arranged on both electrodes according to still other example embodiments.

FIG. 3 is a diagram showing the tunable photonic crystal color filter in which ion spread preventing layers are arranged on both electrodes according to still other example embodiments.

Referring to FIG. 3, in a tunable photonic crystal color filter 10B, the first ion spread preventing layer 16 is arranged on the inner side surface of the first electrode 11, whereas the second ion spread preventing layer 17 is arranged on the inner side surface of the second electrode 15. If the first ion spread preventing layer 16 and the second ion spread preventing layer 17 are arranged together as shown in FIG. 3, ions may be prevented from being spread more effectively as compared to a case in which only either the first ion spread preventing layer 16 or the second ion spread preventing layer 17 is arranged. As described above, according to example embodiments, even if positive ions and negative ions are generated due to electrolysis of a medium, the positive ions and the negative ions may be suppressed or prevented from being spread into a photonic crystal layer. Therefore, a color filter with excellent color fidelity and reliability may be embodied.

Figure 4:
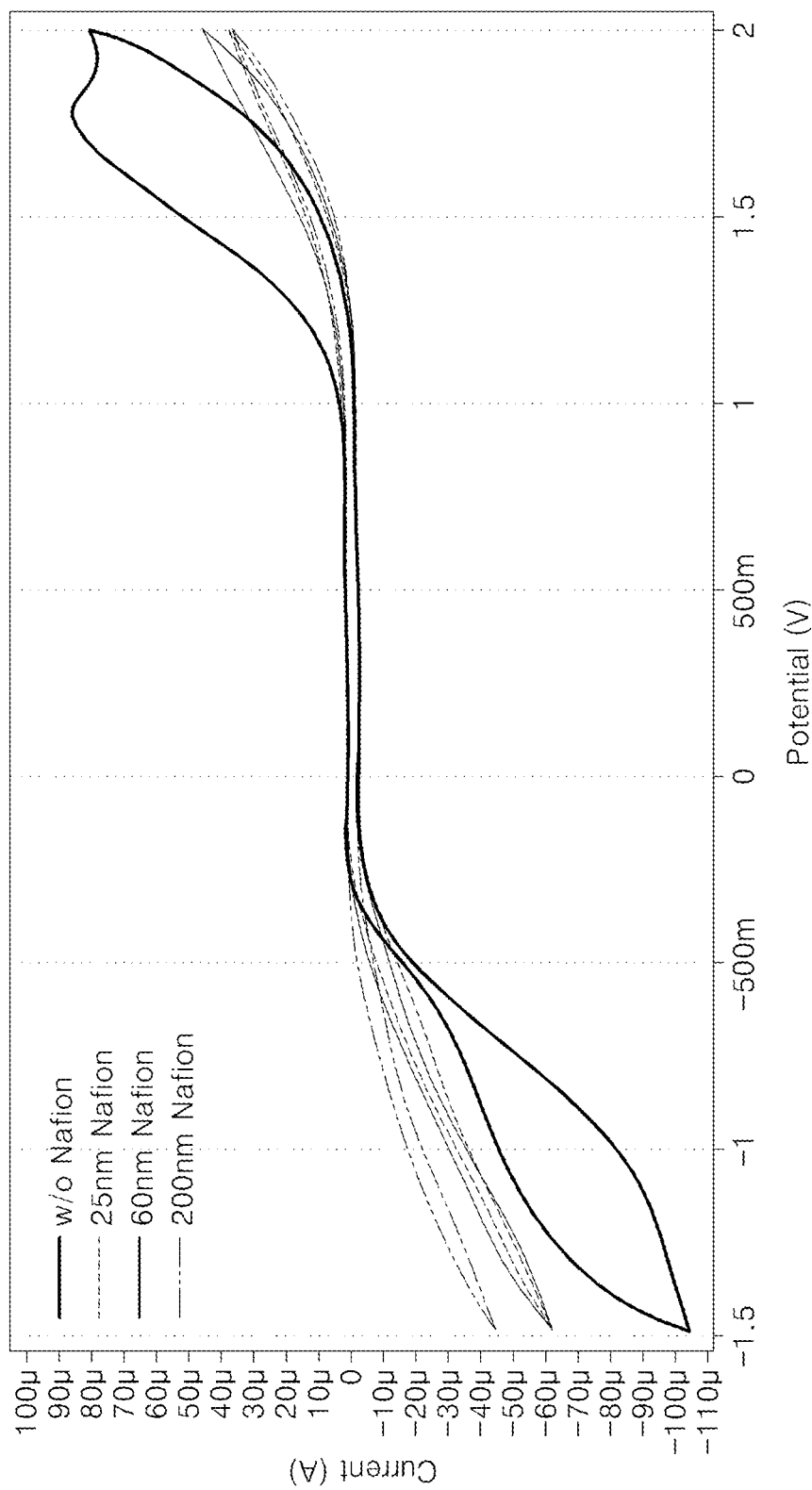
FIG. 4 is a graph showing changes of currents regarding potential with respect to a tunable photonic crystal color filter according to the example embodiments and a color filter according to a comparative embodiment.

FIG. 4 is a graph showing changes of currents regarding potential with respect to a tunable photonic crystal color filter according to the example embodiments and a color filter according to a comparative embodiment.

FIG. 4 shows changes of currents regarding potential in a case where Nafion® CD is arranged on an electrode as a negative ion spread preventing layer according to example embodiments, and a case where Nafion® is not arranged according to a comparative embodiment.

Referring to FIG. 4, in the case where the Nafion® is arranged, changes of current regarding potential are shown according to thicknesses of the Nafion®. The point at which a constantly maintained current decreases or increases corresponds to voltages at which electrolysis occurs. Furthermore, the greater the slope of the current regarding potential is, the more ions move due to electrolysis.

In the case where the Nafion® is not arranged, more ions move due to electrolysis as compared to the case in which the Nafion® is arranged. Furthermore, considering changes of current regarding potential respectively in cases where thickness of the Nafion is 25 nm, 60 nm, and 200 nm, current is changed less significantly as thickness of the Nafion® increases. In other words, the thicker the Nafion® is, the less the negative ions generated by a cathode electrode spread into a photonic crystal layer.

As describe above, according to example embodiments, a period of time in which crystallinity of a photonic crystal layer is maintained may be increased by reducing or preventing negative ions or positive ions generated by electrolysis from being spread into the photonic crystal layer by using an ion spread preventing layer.

Figure 5:
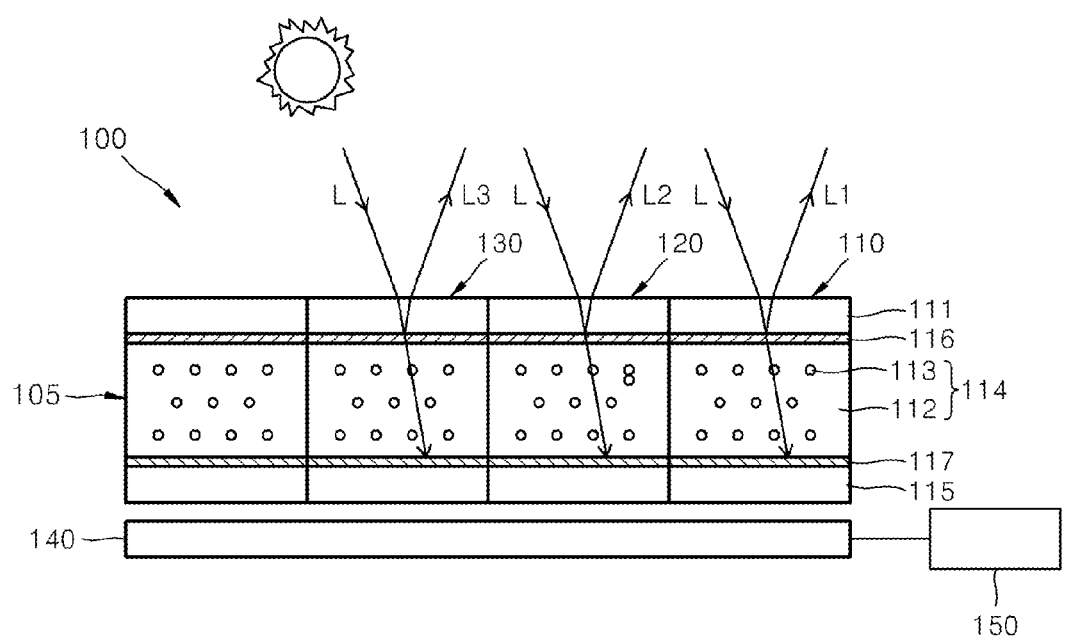
FIG. 5 is a schematic diagram showing a color image display device according to example embodiments.

FIG. 5 is a schematic diagram showing a color image display device according to example embodiments.

Referring to FIG. 5, a color image display device 100 may include a tunable photonic crystal color filter 105, a circuit layer 140 including switching devices for applying voltages to the tunable photonic crystal color filter 105, and a control unit 150 which controls the switching devices and controls the voltages. The tunable photonic crystal color filter 105 may include a plurality of independently-controlled pixels.

The tunable photonic crystal color filter 105 may include a first electrode 111, a second electrode 115 which is arranged to face the first electrode 111, and a photonic crystal layer 114 which is arranged between the first electrode 111 and the second electrode 115. The photonic crystal layer 114 may include a medium 112 and nano particles 113 which are distributed in the medium 112. The nano particles 113 may be distributed in a lattice structure and may be charged. Lattice interval between the nano particles 113 may be changed according to a voltage between the first electrode 111 and the second electrode 115.

At least one of the first electrode 111 and the second electrode 115 may be transparent for light incidence. For example, the first electrode 111 at the side of light incidence may be transparent. The first electrode 11 may be a cathode electrode, whereas the second electrode 15 may be an anode electrode.

An ion spread preventing layer may be arranged on at least one of the first electrode 111 and the second electrode 115. In FIG. 5, a first ion spread preventing layer 116 is arranged below (or, alternatively, under) the first electrode 111, whereas a second ion spread preventing layer 117 is arranged above (or, alternatively, over) the second electrode 115. When the first electrode 111 is a cathode electrode, the first ion spread preventing layer 116 may be a negative ion spread preventing layer. The first ion spread preventing layer 116 may include a layer for suppressing spread of hydroxyl ($OH^{-1}$) ions, for example. When the second electrode 115 is a cathode electrode, the second ion spread preventing layer 117 may be a positive ion spread preventing layer. The second ion spread preventing layer 117 may include a layer for suppressing spread of hydrogen ($H^+$) ions, for example. The first ion spread preventing layer 116 may contain a sulfonated tetrafluoroethylene based fluoropolymer, for example, where the material is commercialized under the trademark of Nafion®.

The second ion spread preventing layer 117 may include at least one from among a quaternary ammonium base, a quaternary pyridinium base, and a quaternary imidazolium base, for example, where the materials are commercialized under the trademark of FAA-3.

Switching devices for applying voltages to the first electrode 111 and the second electrode 115 may be TFT devices, for example. A switching device may function independently with respect to each of pixels. Meanwhile, the first electrodes 111 in the pixels may be insulated from one another, whereas the second electrode 115 may be formed as a common electrode. However, the present invention is not limited thereto.

Referring to FIG. 5, operation of the color image display device will be described below.

The color image display device 100 may include a first pixel 110, a second pixel 120, and a third pixel 130. The control unit 150 may apply voltages to respective pixels by driving switching devices of the circuit layer 140 according to image signals. For example, light L1 of a first wavelength may be reflected from an externally incident light L and lights of other wavelengths may be transmitted by applying a first voltage to the first pixel 110. Light L2 of a second wavelength may be reflected from the externally incident light L and lights of other wavelengths may be transmitted by applying a second voltage to the second pixel 120. Light L3 of a third wavelength may be reflected from an externally incident light L and lights of other wavelengths may be transmitted by applying a third voltage to the third pixel 130. In this regard, a color image may be displayed by reflecting lights of predetermined (or, alternatively, set) wavelengths from respective pixels.

Here, as described above with reference to FIGS. 1 through 3, the tunable photonic crystal color filter 105 includes an ion spread preventing layer, thereby suppressing deterioration of crystallinity of the first electrode 114 by preventing ions generated by the first electrode 111 and the second electrode 115 from being spread into the photonic crystal layer 114. Therefore, color reproducibility and reliability of the tunable photonic crystal color filter 105 may be improved even if the tunable photonic crystal color filter 105 is repeatedly driven.

Figure 6:
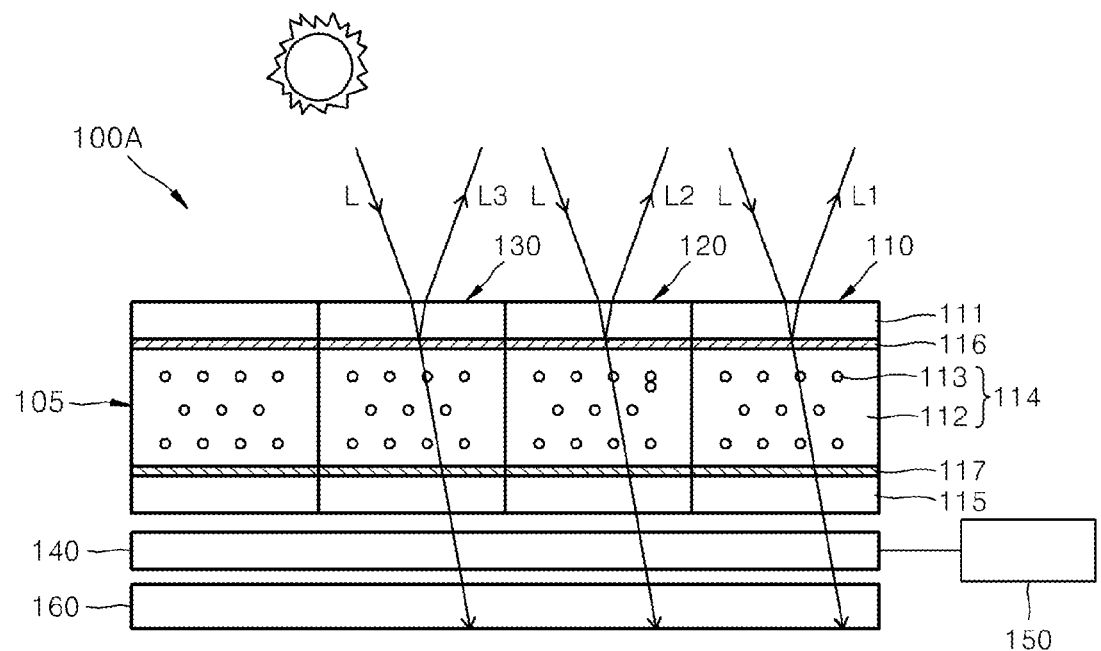
FIG. 6 is a diagram showing a color image display device according to example embodiments.

FIG. 6 is a diagram showing a color image display device according to other example embodiments.

Referring to FIG. 6, in comparison to the color image display device 100 of FIG. 5, a color image display device 100A further includes a light absorbing layer 160 below the circuit layer 140. The tunable photonic crystal color filter 105 reflects only lights of predetermined (or, alternatively, set) colors based on the structure of the photonic crystal layer 114 and transmits lights of other colors. Here, to prevent transmitted light from being reflected back to outside by other device or layers and affecting displayed images, the light absorbing layer 160 is arranged below (or, alternatively, under) the circuit layer 140 to absorb the transmitted lights. Accordingly, quality of color images may be improved.

The foregoing is illustrative of example embodiments and is not to be construed as limiting thereof. Although a few example embodiments have been described, those skilled in the art will readily appreciate that many modifications are possible in example embodiments without materially departing from the novel teachings. Accordingly, all such modifications are intended to be included within the scope of the disclosure as defined in the claims. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

What is claimed is:

1. A tunable photonic crystal color filter, comprising:
   a first electrode;
   a second electrode facing the first electrode;
   a medium between the first electrode and the second electrode;
   nano particles distributed in the medium with a lattice structure, the nano particles being charged; and
   an ion spread preventing layer over a surface of at least one of the first electrode and the second electrode,
   wherein the ion spread preventing layer includes a barrier layer suppressing ions selected from hydroxyl ions and hydrogen ions, the ions being generated on the at least one of the first electrode and the second electrode from spreading into at least one of the medium and the nano particles.

2. The tunable photonic crystal color filter of claim 1, wherein the ion spread preventing layer is formed of a perfluorocarbonic sulfonic acid or a sulfonated tetrafluoroethylene based fluoropolymer.

3. The tunable photonic crystal color filter of claim 1, wherein the ion spread preventing layer comprises at least one selected from a quaternary ammonium base, a quaternary pyridinium base, and a quaternary imidazolium base.

4. The tunable photonic crystal color filter of claim 1, wherein at least one of the first electrode and the second electrode is a transparent electrode.

5. The tunable photonic crystal color filter of claim 1, wherein
   the first electrode is transparent, and
   the second electrode is black.

6. The tunable photonic crystal color filter of claim 1, wherein the medium comprises an aqueous solution.

7. The tunable photonic crystal color filter of claim 1, wherein
   the first electrode is a cathode electrode, and
   a negative ion spread preventing layer is over an inner side surface of the first electrode.

8. The tunable photonic crystal color filter of claim 1, wherein
the second electrode is an anode electrode, and
a positive ion spread preventing layer is over an inner side surface of the second electrode.

9. The color image display device of claim 1, wherein the ion spread preventing layer is formed of a perfluorocarbonic sulfonic acid or a sulfonated tetrafluoroethylene based fluoropolymer.

10. The color image display device of claim 1, wherein the ion spread preventing layer comprises at least one selected from a quaternary ammonium base, a quaternary pyridinium base, and a quaternary imidazolium base.

11. A color image display device, comprising:
a first electrode;
a second electrode facing the first electrode;
a medium between the first electrode and the second electrode;
nano particles distributed in the medium, the nano particles being in a lattice structure and the nano particles being charged;
an ion spread preventing layer over a surface of at least one of the first electrode and the second electrode,
wherein the ion spread preventing layer includes a barrier layer suppressing ions selected from hydroxyl ions and hydrogen ions, the ions being generated on the at least one of the first electrode and the second electrode from spreading into at least one of the medium and the nano particles;
a circuit layer including a plurality of switching devices, the circuit layer being configured to apply voltages to the first electrode and the second electrode; and
a control unit configured to control the switching device and the circuit layer.

12. The color image display device of claim 11, wherein the second electrode is formed of a conductive metal oxide.

13. The color image display device of claim 11, wherein at least one of the first electrode and the second electrode is a transparent electrode.

14. The color image display device of claim 11, wherein
the first electrode is transparent, and
the second electrode is black.

15. The color image display device of claim 11, wherein the medium comprises an aqueous solution.

16. The color image display device of claim 11, further comprising:
a light absorbing layer under the circuit layer.

17. A tunable color filter that modulates color of a reflected light by changing a photon band gap of a photonic crystal layer, comprising:
electrode layers separated from each other;
the photonic crystal layer interposed between the electrode layers; and
an ion spread preventing layer interposed between the photonic crystal layer and at least one of the electrode layers, wherein the ion spread preventing layer includes sulfur.

18. The tunable color filter of claim 17, wherein the photonic crystal layer comprises:
an aqueous medium between the electrode layers; and
charged nano particles dispersed in the aqueous medium.

19. The tunable color filter of claim 18, wherein,
the charged nano particles are spread apart from each other in the form of a lattice structure, and
an interval between the charged nanoparticles changes based on a voltage across the electrode layers.

* * * * *